United States Patent

[11] 3,552,295

| [72] | Inventor | William A. Armstrong<br>Grosse Ile, Mich. |
|---|---|---|
| [21] | Appl. No. | 799,028 |
| [22] | Filed | Feb. 13, 1969 |
| [45] | Patented | Jan. 5, 1971 |
| [73] | Assignee | General Motors Corporation<br>Detroit, Mich.<br>a corporation of Delaware |

[54] AIR CONDITIONER GRILL HAVING PIVOTING HORIZONTAL AND VERTICAL LOUVERS
1 Claim, 6 Drawing Figs.

| [52] | U.S. Cl. | 98/110,<br>98/121 |
|---|---|---|
| [51] | Int. Cl. | F24f 13/00 |
| [50] | Field of Search | 98/110,<br>112, 121 |

[56] References Cited
UNITED STATES PATENTS

| 2,920,549 | 1/1960 | Freitzg | 98/110 |
|---|---|---|---|
| 2,940,375 | 6/1960 | Schucker | 98/110 |
| 2,959,117 | 11/1960 | Wright | 98/110 |
| 3,456,574 | 7/1969 | Jakeway | 98/121 |

*Primary Examiner*—Meyer Perlin
*Attorneys*—Warren E. Finken and John C. Evans

ABSTRACT: In preferred form an air directing grill mountable at the outlet of an air conveying tube having pivotal horizontal and pivotal vertical louvers for directing airflow in alternate directions. Interconnecting means link the horizontal louvers for limited rotation together and second interconnecting means link the vertical louvers for rotation together. Vertical adjustment of a knob which is supported on one of the horizontal louvers pivots the interconnected horizontal louvers to change the elevational path of air flowing from the outlet. The knob is mounted on the one horizontal louver to permit linear horizontal sliding adjustment thereon. This sliding adjustment of the knob causes a protruding portion on the knob to rotate a crankshaft on a vertical axis which through a gear drive means pivots the vertical louvers to change the lateral path of the flowing air from the outlet.

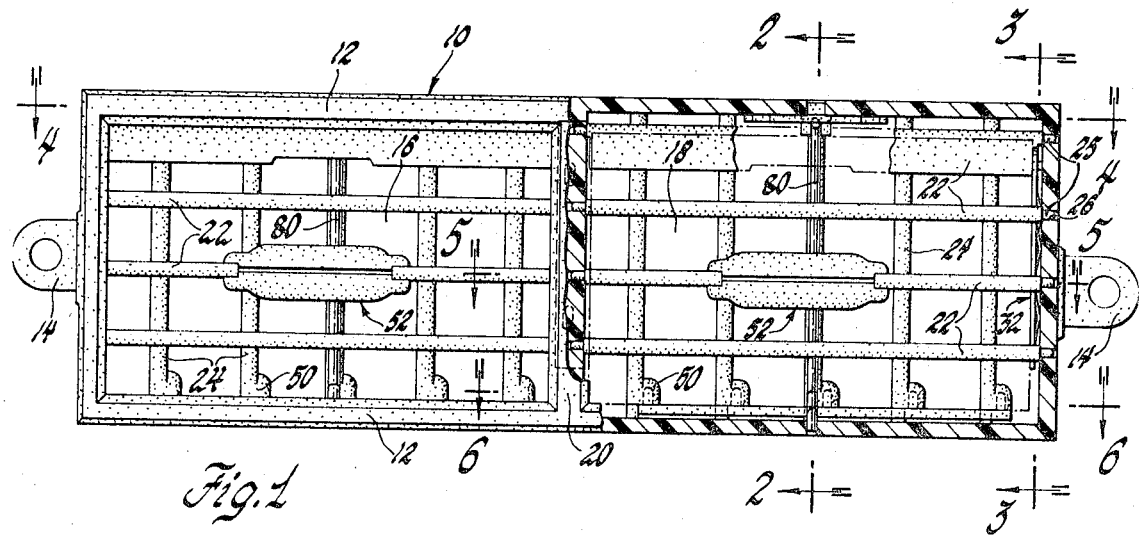
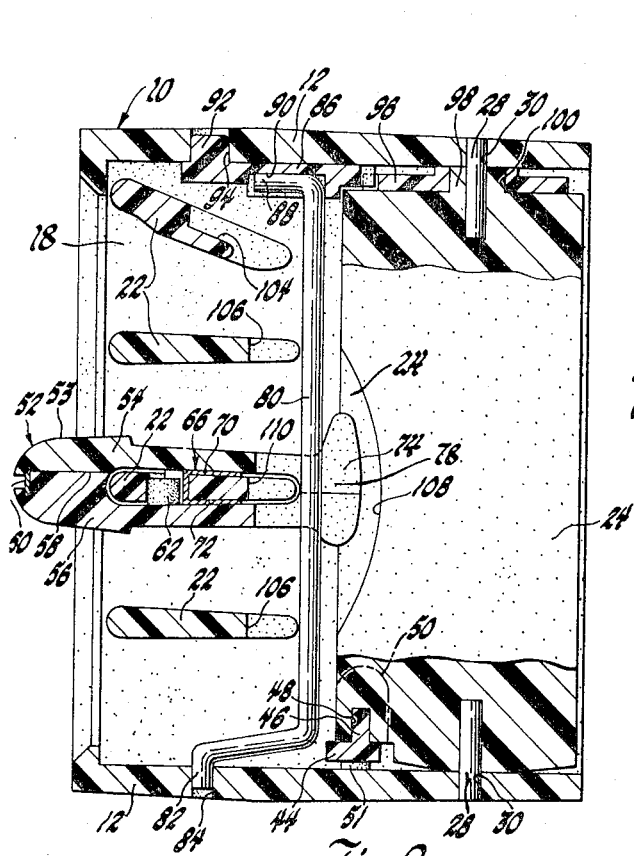
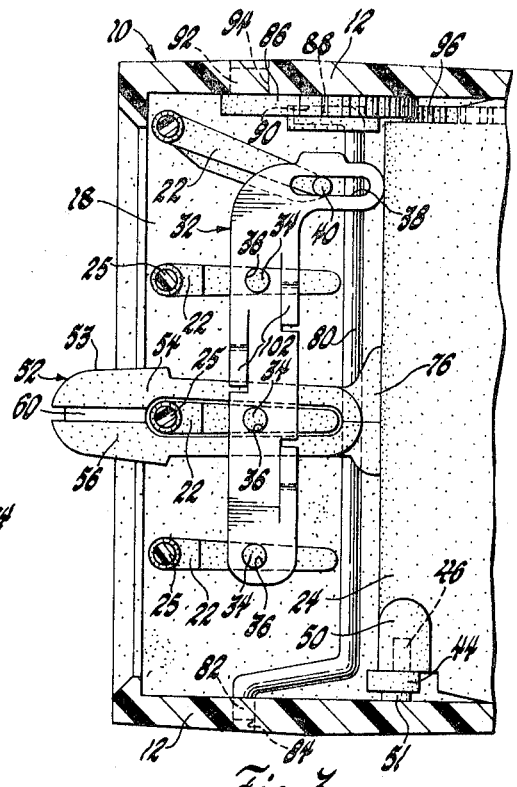

INVENTOR.
William A. Armstrong
BY
J. C. Evans
ATTORNEY

AIR CONDITIONER GRILL HAVING PIVOTING HORIZONTAL AND VERTICAL LOUVERS

This invention relates to air deflection structures and more particularly to an adjustable air directing outlet grill having pivotal horizontal and vertical louvers which are actuated by a single control member.

An outlet grill mountable in the outlet of an air conveying tube or duct which is adjustable horizontally and vertically by a single control member to change the direction of airflow from the duct has many applications. For example, such an adjustable air directing outlet grill is desirable on an automobile air conditioning duct for changing the airflow direction of cool air entering the automobile interior. A single control member which adjusts both the position of the horizontal louvers and the vertical louvers is more convenient than separate manually positioned horizontal and vertical controls.

Because the space available within an air conditioning outlet is limited, a compact adjustment mechanism is desirable. An adjustment mechanism which is contained within the boundaries defined by the horizontal and vertical louvers is preferable.

Space is conserved in the outlet grill of the present invention by supporting the single control member on one of the horizontal louvers and by linking the horizontal louvers together for common movement. With this arrangement, vertical adjustment of the control member directly pivots the horizontal louvers.

Pivotal adjustment of the vertical louvers is accomplished by means positioned between the horizontal set of louvers and the vertical set of louvers. The control member is mounted upon the one horizontal louver to permit horizontal sliding thereon. A protruding portion of the control member engages and rotates a crankshaft when it is slid along the louver. A gear attached on one end of a vertically disposed crankshaft engages and drives a second gear which is attached to one vertical louver. Limited rotation of the one vertical louver by the gear drive shifts the remaining vertical louvers through an interconnecting linkage. Thus, it can be seen that a unitary horizontal and vertical adjustment mechanism is contained within boundaries defined by the horizontal and vertical set of louvers which substantially contributes to the compactness of the outlet grill of the present invention.

In grills of the type under consideration, smoothness of operation is of importance. A further important consideration is whether the louvers hold their adjusted position without displacement or rattling.

The crankshaft driven gear drive of the present invention produces substantial pivotal louver movement and displays low friction characteristics which contribute to its smooth operation. In addition, the gear drive permits design modifications in the turning ratio between crankshaft rotation and vertical louver rotation and also in the mechanical ratio between crankshaft input torque and resultant drive torque exerted on the vertical louvers.

Another feature of the present invention is the provision of integral cantilevered springs struck out of or molded on the louver linkages. By compression between the linkage and the outlet frame, these springs preload the adjustment mechanism to develop a desirable operating feel and to eliminate rattling. The springs also retain the louvers in a preset position which eliminates the annoyance of frequent repositioning.

An object of the present invention is the provision of a compact adjustable air directing outlet having plural horizontal and vertical louvers which are pivoted for airflow regulation by a single control member and by pivotal drive means wholly contained within the boundaries defined by the horizontal and vertical louvers.

A further object of the present invention is the provision of an adjustable air directing outlet having plural horizontal and vertical louvers capable of relatively great angular movement and which are pivoted by a control knob on one of the horizontal louvers and noninterferring drive means within the space defined by the horizontal and vertical louvers.

Another object of the present invention is the provision of an adjustable air directing outlet having an adjusting mechanism including means for smoothly moving horizontal and vertical louvers through limited rotative or pivotal movement.

A still further object of the present invention is to eliminate play and rattles in a multilouver grill structure for air direction control by the provision of an interconnecting link between the horizontal louvers having integral cantilevered spring means thereon which generate a motion resisting preload force and a rattle preventing friction force between the link and an adjacent surface.

Further objects and advantages of the present invention will be apparent from the following description, reference being had to the accompanying drawings wherein a preferred embodiment of the present invention is clearly shown.

In the drawings:

FIG. 1 is a front elevational view of the adjustable air directing outlet sectioned to more clearly reveal the pivotal horizontal and vertical louvers;

FIG. 2 is an enlarged vertical sectional view taken along the section line 2-2 of FIG. 1 looking in the direction of the arrows;

FIG. 3 is an enlarged vertical sectional view taken along the section line 3-3 in FIG. 1 looking in the direction of the arrows;

Figure 4:
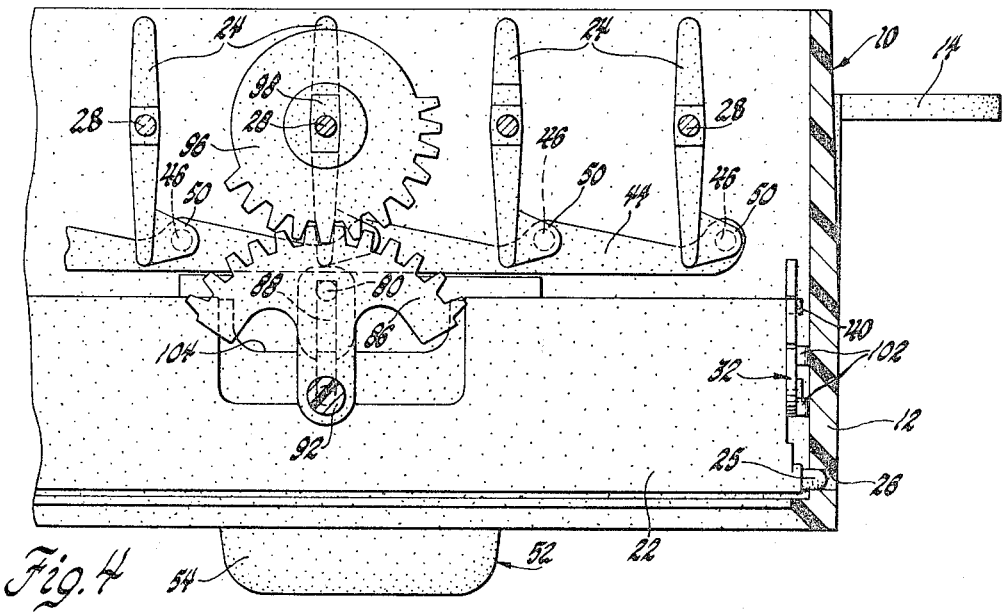
FIG. 4 is an enlarged horizontal sectional view taken along section line 4-4 of FIG. 1 looking in the direction of the arrows.

In FIG. 1 of the drawings, an air directing outlet grill 10 is illustrated including a rectangular frame 12 molded of plastic material and having flanges 14 thereon for attachment of the outlet grill 10 to a dashboard (not shown) of an automobile. The rectangular frame 12 is divided into two outlet sections 16 and 18 by an integral wall 20. A plurality of horizontal louvers 22 and vertical louvers 24 are supported within each of the sections 16 and 18 of outlet grill 10.

The horizontal louvers 22 are supported between the side portion of frame 12 and wall 20 to permit limited rotative movement around a horizontal axis. The horizontal louvers pivot about pins 25 which project from the ends of the louvers into bores 26 within frame 12 and wall 20. The vertical louvers, as been seen in FIG. 2, are similarly mounted between the top and bottom of frame 12 for rotation around pins 28 which project into bores 30 within frame 12.

The horizontal louvers 22 are interconnected for limited rotative movement together by a linkage arm 32 as best seen in FIG. 3. Projecting circular tabs 34 on the ends of horizontal louvers 22 extend into holes 36 through arm 32. A horizontal slot 38 in the upper end of link 32 engages a projecting circular tab 40 on the uppermost horizontal louver 22. Linkage arm 32 interconnects the lower three horizontal louvers 22 for rotative movement together so as to maintain the louvers substantially in parallel planes throughout their movement. The uppermost horizontal louver 22 pivots with the other horizontal louvers 22 but at a lesser angular rate caused by the greater moment arm between tab 40 and pin 25 and the coaction between horizontal slot 38 and tab 40. This modification in the degree of rotation is obviously necessitated by the proximity of the uppermost horizontal louver 22 with the topside of frame 12.

Figure 6:
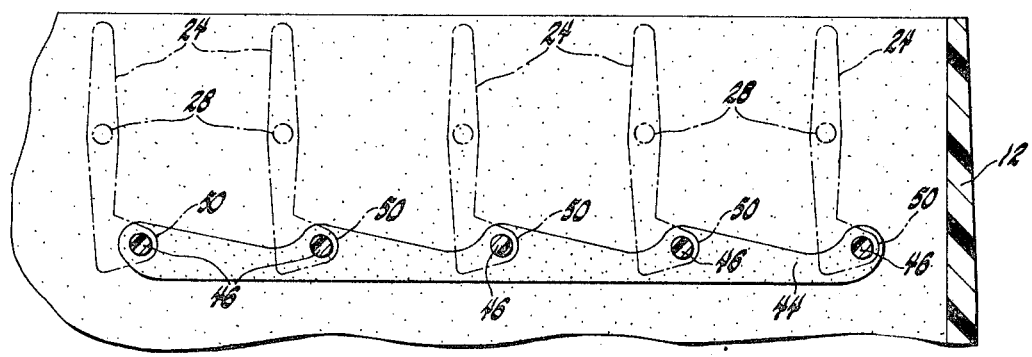
FIG. 6 is an enlarged fragmentary horizontal sectional view taken along the section line 6-6 of FIG. 1 looking in the direction of the arrows.

The vertical louvers 24 are interconnected for rotative movement together by a linkage arm 44 as best seen in FIG. 6. Linkage arm 44 includes spaced upwardly directed tabs 46 adapted for insertion into bores 48 within a molded flanged portion 50 on the bottom, front edge of each of the vertical louvers 24. The arm 44 is held against the bottom end of the vertical louvers 24 by an upstanding ridge 51 on the bottom of frame 12. Because of coaction between link 44 and vertical louvers 24, limited rotational movement of one of the vertical louvers 24 will produce like rotation of the remaining vertical louvers 24.

Adjustment of the angular position of horizontal louvers 22 changes the elevational direction of airflow through outlet grill 10 and is effected by vertically moving a control member 52 which is supported on one of the horizontal louvers. More particularly, the control member 52 includes a knob 53. Knob 53 is made up of an upper portion 54 and a lower portion 56 which are joined together around the middle horizontal louver 22. The portions 54 and 56 are secured one to another along a breakline 58 by conventional means for joining plastic bodies. A decorative strip or applique 60 is held between upper portion 54 and lower portion 56 to impart a decorative appearance to the front of knob 52.

When knob 53 is moved in a vertical direction, the middle louver 22 pivots around pins 25. This movement of the middle louver 22 causes linkage arm 32 to pivot the remaining horizontal louvers 22.

The upper portion 54 and the lower portion 56 of knob 53 are joined together around middle louver 22 to permit linear sliding movement of the control member 52 along its length. An upwardly extending guide tab 62 on the lower portion 56 of knob 53 extends into an elongated slot 64 through part of the length of middle louver 22. Coaction between guide pin 62 and slot 64 limits lateral sliding movement of control member 52.

A spring clip 66 in slot 64 is positioned on the top and bottom surfaces of middle louver 22 between portions 54 and 56 of knob 53 to eliminate rattling between the knob 53 and the louver 22. More particularly, the spring 66 includes a bight portion 68 which joins upper and lower arm portions 70, 72, respectively, extending perpendicularly from the bight portion 69 68 around the louver 22. The spring portions 70 and 72 are curved like a bow and are compressed between the upper and lower portions 54 and 56 of knob 53 and louver 22 to take up slack therebetween.

Figure 5:
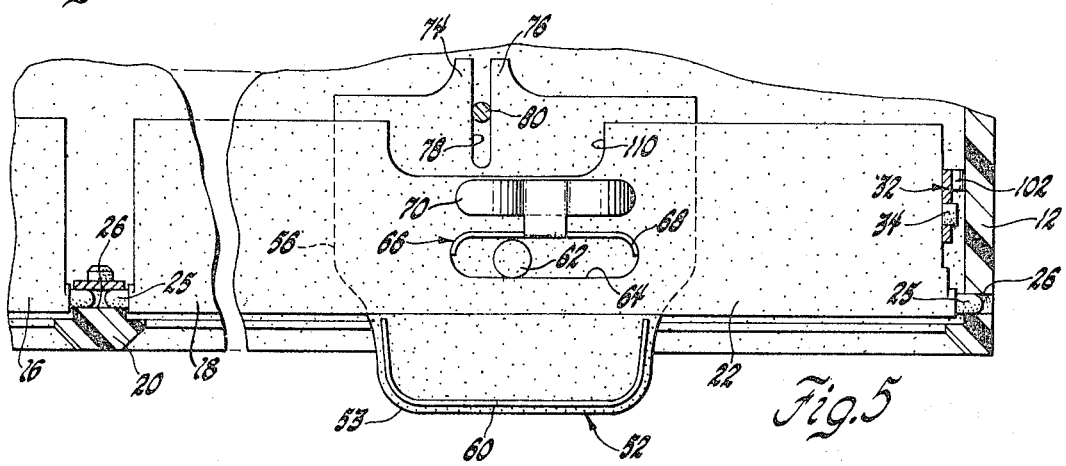
FIG. 5 is an enlarged fragmentary horizontal sectional view taken along the section line 5-5 of FIG. 1 and looking in the direction of the arrows.

Control member 52 further includes two rearwardly projecting flanges 74 and 76 as best seen in FIG. 5. They define an elongated slot 78 extending perpendicular to the direction of linear sliding movement of knob 52. A vertical wire crankshaft or swing bar 80 extends between the top and bottom surfaces of frame 12 through elongated slot 78. Swing bar 80 is supported for rotative movement at its lower end 82 in a bearing hole 84 in the bottom of frame 12. An upper end 88 of swing bar 80 is attached to a pivotal drive gear sector 86. More particularly, the upper end 88 is bent perpendicularly and is retained in a recessed channel 90 of gear sector 86 to attain simultaneous limited rotation of swing bar 80 and gear sector 86. An upwardly extending bearing boss 92 upon gear sector 86 extends into a bearing hole 94 within the top surface of frame 12 for limited rotative movement therein. Thus, the swing bar 80 moves with gear sector 86 about an axis extending between bearing hole 84 and bearing hole 94 within the lower surface and the upper surface of frame 12 respectively.

A driven gear 96 is connected to the middle vertical louver 24 and both are rotated by gear sector 86 which engages the gear 96. More particularly, gear 96 is supported upon middle vertical louver 24 and located between the top surface of frame 12 and louver 24. An upwardly projecting, noncircular, integral tab portion 98 on the end of middle louver 22 is inserted into a matching hole 100 through gear 96 for attaining simultaneous limited rotation between the gear 96 and louver 24. Limited rotational movement of the middle vertical louver 24 is transmitted to the remaining vertical louvers 24 by the linkage arm 44 as previously stated.

Horizontal and vertical pivotal adjustment of the louvers is achieved by movement of the single control member 52. The horizontal louvers 22 are pivoted by a vertical movement of control member 52, and limited rotational movement of louvers 24 occurs when the control member 52 is moved laterally.

Linkage arm 32 is located between the horizontal louvers 22 and the side of frame 12 as shown in FIG. 5. Molded or struck out cantilevered springs 102 are formed in linkage arm 32 and project toward the sides of frame 12 to prevent the linkage arm 32 from lateral movement or vibration by resiliently biasing it against the adjacent end edges of louvers 22.

Because the uppermost horizontal louver 22 pivots about a point adjacent the top surface of frame 12, a central cutout 104 is necessitated to avoid interference between the upper louver 22 and drive gear 86 upon upward pivotal movement of the horizontal louver 22. Other cutouts 106 on the remaining horizontal louvers 22 are necessary to prevent interference with the swing bar 80.

As stated, vertical pivotal adjustment of louvers 24 is accomplished by sliding knob 52 along middle horizontal louver 22 in alternate lateral directions. The lateral movement of the knob 52 causes swing bar 80 to move within slot 78 and rotate about an axis through bearing holes 84 and 94 in frame 12. The rotation of swing bar 80 causes attached drive gear sector 86 to pivot about bearing boss 92 within bearing hole 94. Coaction between drive gear 86 and gear 96 moves attached middle vertical louver 24 and the remaining vertical louvers 24 about an axis extending through bearing holes 30 in frame 12.

To prevent interference between the middle vertical louver 24 and flanges 74 and 76 on knob 53 when the knob is slid along middle louver 22, a cutout 108 is formed in middle vertical louver 24 as best illustrated in FIG. 2. Another cutout 110 identical to cutouts 106 is formed in middle horizontal louver 22 to prevent interference as swing bar 80 moves forward within slot 78.

While the embodiment of the present invention as herein described constitutes a preferred form, it is to be understood that other forms might be adapted.

I claim:

1. An air directing outlet grill having an outer frame adapted to be mounted in the outlet end of an air conveying duct comprising: a plurality of louvers each pivotal about a horizontal axis; a plurality of louvers each pivotal about a vertical axis; first interconnecting means on said horizontally pivotal louvers linking said horizontal louvers for concurrent limited rotational movement; second interconnecting means on said vertically pivotal louvers linking said vertical louvers for concurrent limited rotational movement; a knob supported on one of said horizontal louvers for pivoting said horizontal louvers about their horizontal axes; said knob being slidable along said one horizontal louver in a direction parallel to the axes of said one louver; crankshaft means including a swing bar having one end portion pivotally mounted in the bottom of said frame, the other end portion connected to a pivotal drive gear sector mounted in the top of said frame and center portion offset from the axis of rotation of said swing bar; flanges on said slidable knob coactive with said center portion of said swing bar to pivot said swing bar and said connected drive gear sector in response to sliding movement of said knob along said one horizontal louver; a driven gear segment on the end of one of said vertical louvers between its end and the top of said frame coactive with said drive gear segment to pivot said vertical louvers in response to pivotal movement of said swing bar and connected drive gear segment.